(12) United States Patent
Gamble et al.

(10) Patent No.: US 10,459,941 B2
(45) Date of Patent: Oct. 29, 2019

(54) PROVIDING CONTEXT-SPECIFIC CONTENT RELATING TO A DISPLAYED PERSONAL INFORMATION MANAGEMENT (PIM) MESSAGE FOR DISPLAY IN A USER INTERFACE OF A PIM APPLICATION

(71) Applicant: salesforce.com, inc., San Francisco, CA (US)

(72) Inventors: Christopher David Gamble, Mountlake Terrace, WA (US); Damien Joly, Piedmont, CA (US)

(73) Assignee: salesforce.com, inc., San Francisco, CA (US)

( * ) Notice: Subject to any disclaimer, the term of this patent is extended or adjusted under 35 U.S.C. 154(b) by 257 days.

(21) Appl. No.: 15/439,033

(22) Filed: Feb. 22, 2017

(65) Prior Publication Data
US 2018/0239766 A1   Aug. 23, 2018

(51) Int. Cl.
*G06F 3/048* (2013.01)
*G06F 16/25* (2019.01)
*G06F 3/0486* (2013.01)

(52) U.S. Cl.
CPC .......... *G06F 16/252* (2019.01); *G06F 3/0486* (2013.01)

(58) Field of Classification Search
CPC ........................... G06F 17/3056; G06F 3/0486
USPC ......................................................... 715/739
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |

(Continued)

*Primary Examiner* — David Phantana-angkool
(74) *Attorney, Agent, or Firm* — Lorenz & Kopf, LLP

(57) ABSTRACT

A method of generating context-specific content from a database system for display in a user interface of a personal information management (PIM) application is provided. The method comprises receiving, by a database server, user selection of one or more database applications from a requesting user to generate context-specific content customized by the requesting user for display in a PIM application user interface. The method further comprises generating, using the user-selected database applications, user-customized context-specific content and transmitting to the PIM application, by the database server, the user-customized context-specific content for display in the PIM application user interface along with a PIM message. The user-customized context-specific content is relevant to the PIM message. Related apparatus, systems, techniques and articles are also described.

20 Claims, 9 Drawing Sheets

(56) References Cited

U.S. PATENT DOCUMENTS

| | | |
|---|---|---|
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,904,468 B2* | 3/2011 | Neil ................ G06F 16/90328 707/763 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,438,554 B2* | 9/2016 | Fleck .................. H04L 51/36 |
| 9,449,335 B2* | 9/2016 | Greenberg ............ G06F 8/38 |
| 9,535,722 B2* | 1/2017 | Lee ............. H04N 21/42204 |
| 9,762,520 B2* | 9/2017 | Wang .................. H04L 51/18 |
| 9,893,905 B2* | 2/2018 | Donneau-Golencer ................. H04L 12/1886 |
| 9,912,775 B2* | 3/2018 | Durham ............ H04L 67/2828 |
| 9,992,322 B2* | 6/2018 | Knight ................. G06Q 10/10 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0006530 A1* | 1/2009 | Martin .................. H04L 67/26 709/203 |
| 2009/0063414 A1 | 3/2009 | White et al. |
| 2009/0100342 A1 | 4/2009 | Jakobson |
| 2009/0177744 A1 | 7/2009 | Marlow et al. |
| 2010/0036926 A1* | 2/2010 | Ahart .................. G06Q 10/10 709/206 |
| 2011/0191802 A1* | 8/2011 | Haberman ............ G06Q 30/02 725/34 |
| 2011/0247051 A1 | 10/2011 | Bulumulla et al. |
| 2012/0042218 A1 | 2/2012 | Cinarkaya et al. |
| 2012/0158472 A1* | 6/2012 | Singh ............ G06F 17/30241 705/14.4 |
| 2012/0218958 A1 | 8/2012 | Rangaiah |
| 2012/0233137 A1 | 9/2012 | Jakobson et al. |
| 2013/0080242 A1* | 3/2013 | Alhadeff ............ G06Q 30/0239 705/14.39 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0134372 A1* | 5/2015 | Lopez Ruiz ............ G06Q 10/02 705/5 |

(56) References Cited

U.S. PATENT DOCUMENTS

| | | | |
|---|---|---|---|
| 2015/0206441 A1* | 7/2015 | Brown | G09B 5/00 434/308 |
| 2016/0378637 A1* | 12/2016 | Gamble | G06F 11/362 707/702 |
| 2018/0239766 A1* | 8/2018 | Gamble | G06F 3/0486 |

* cited by examiner

PROVIDING CONTEXT-SPECIFIC CONTENT RELATING TO A DISPLAYED PERSONAL INFORMATION MANAGEMENT (PIM) MESSAGE FOR DISPLAY IN A USER INTERFACE OF A PIM APPLICATION

TECHNICAL FIELD

Embodiments of the subject matter described herein relate generally to computer systems, and more particularly, to methods and systems for generating context-specific content for display in the user interface of a personal information management (PIM) application.

BACKGROUND

Many organizations are moving toward cloud-based services and infrastructure to provide on-demand services. Many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over the network "as a service" supplied by the infrastructure provider.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a block diagram depicting a screenshot of an example user interface for a PIM application.

DETAILED DESCRIPTION

The subject matter described herein discloses apparatus, systems, techniques and articles for providing context-specific content generated by a remote computer system for display in a user interface of a personal information management (PIM) application. A user may select one or more functional tools from the remote computer system such as a platform-as-a-service (PaaS) system, a software-as-a-service (SaaS) system, an infrastructure-as-a-service (IaaS) system, a backend-as-a-service (BaaS) system, a proprietary computer system, or some other type of computing system to generate context-specific content for display in a PIM application user interface. The user-selected functional tools can generate content that is related to a selected PIM message (i.e., context-specific content) and transmit the context-specific content to the PIM application for display in the PIM application user interface along with the selected PIM message. As used herein, a PIM message may refer to an email message or a calendar event. In some examples, apparatus, systems, techniques and articles disclosed herein, database applications are utilized as the functional tools. In some examples, apparatus, systems, techniques and articles disclosed herein, the database applications can be provided by the remote computer system, third-party developers, and/or developer's associated with a user's organization.

Figure 1:
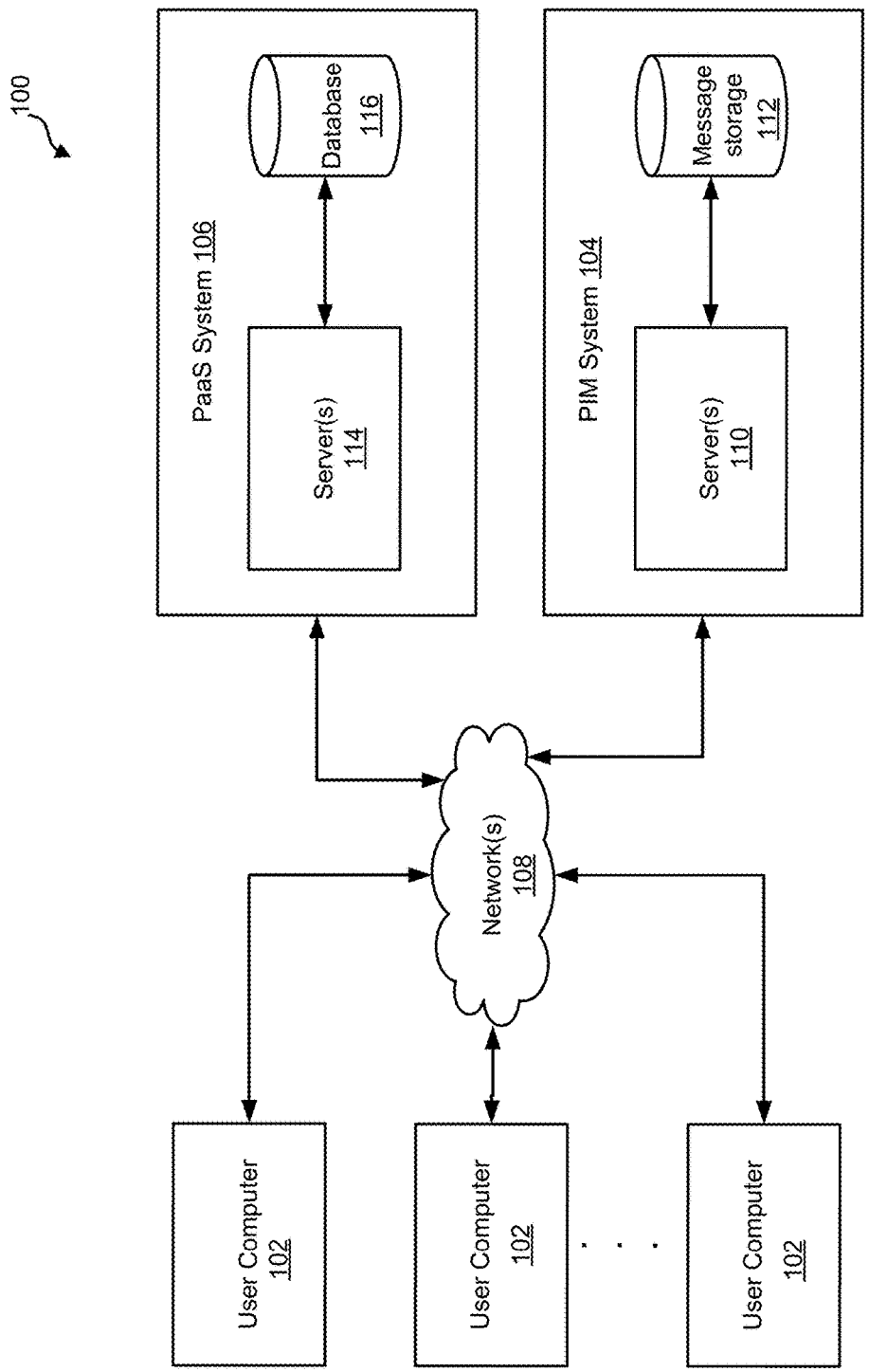
FIG. 1 is a block diagram of an example computing environment.

FIG. 1 is a block diagram of an example computing environment 100 that can be used to implement aspects of the current subject matter. The example system includes one or more user computers 102 that interface with a cloud-based PIM system 104 and a cloud-based computing system such as a PaaS system 106 via a network 108. Example cloud-based PIM systems include Outlook and Gmail which both offer an email and calendar service. The example PIM system includes one or more servers 110 coupled to message storage units 112. An example PaaS system includes the Salesforce customer relationship management (CRM) system. The example PaaS system 106 includes one or more servers 114 coupled to a database 116 for executing database applications and providing data to user computers.

Figure 2:
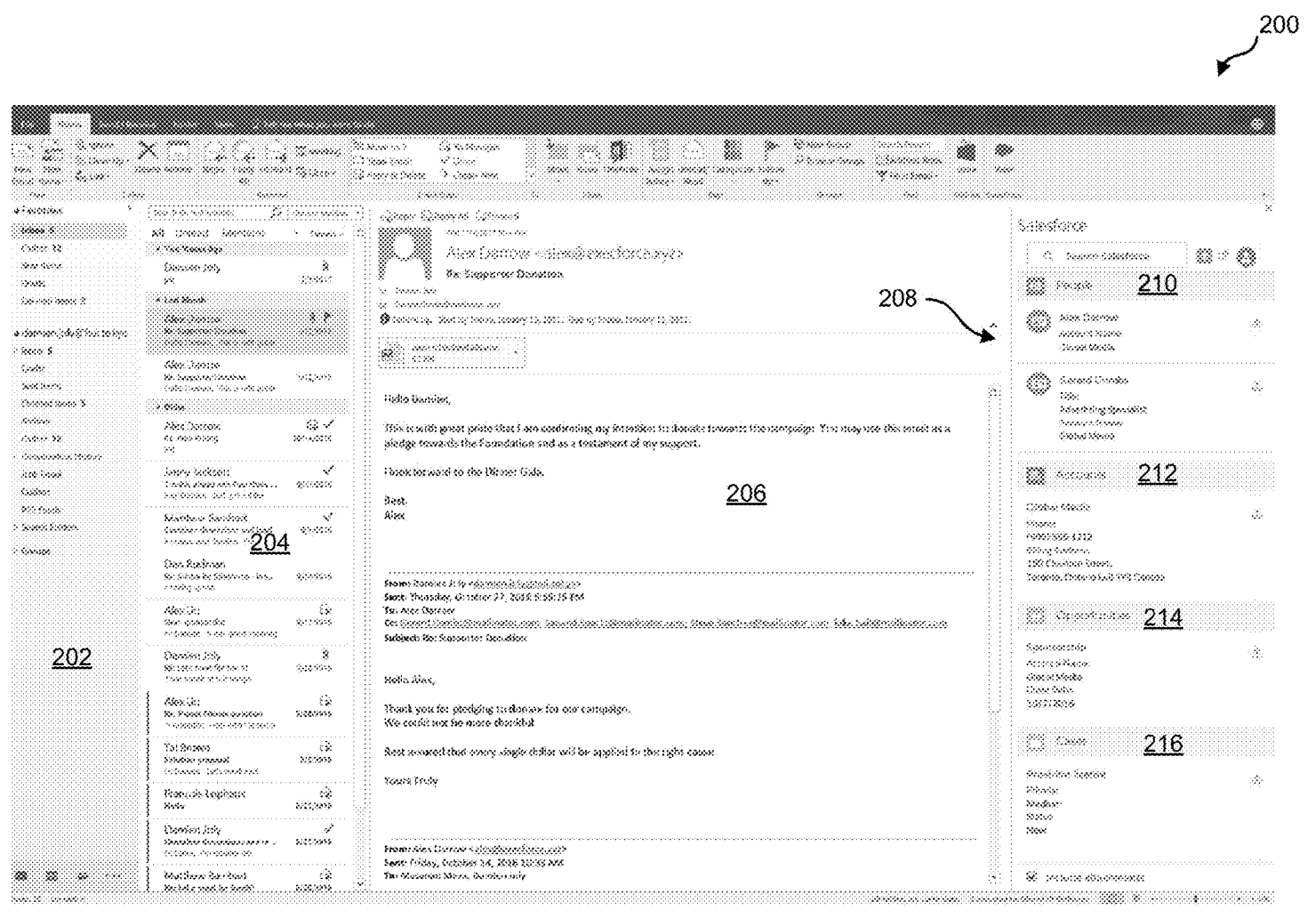

FIG. 2 is a block diagram depicting a screenshot of an example user interface for a PIM application. In this example, when a user computer accesses the PIM system using a web browser, the PIM application provides a user interface in the form of a web page 200 for display in the web browser. In other examples, the PIM application may provide a user interface from an installed application. The techniques described herein are applicable to a user interface provided by an installed application as well as a user interface provided by a web browser.

When email messages are displayed by the PIM application, the user interface may display a first pane 202 containing a listing of the user's email folders, a second pane 204 containing a listing of messages in a selected user email folder, and a third pane 206 containing a view of a selected message. The display of the first, second and third pane may be native PIM application functionality. The user interface can display in a fourth pane 208 (i.e., context-specific content pane) context-specific content regarding the selected message. In this example, the context-specific content includes people content 210, accounts content 212, opportunities content 214, and cases content 216. In other examples, other types of context-specific content may be displayed such as social network feed content involving the PIM message participants, social network feed content involving the PIM message subject, recent communications content involving the PIM message participants, recent communications content involving the PIM message subject, and other types of content. In this example, the people content 210 includes information regarding email participants such as name, job title, account name, and company relating to the participants of the email message. The account content includes an account name and billing address regarding email participants. The opportunities content includes a product name (including quantity or dollar amount), account name, and close date for previous sales regarding email participants. The cases content includes information regarding the priority of the case.

When calendar events are displayed by the PIM application, the user interface may display, in addition to displaying a calendar, a separate pane containing context-specific content. This context-specific content may be similar to that displayed with an email message or may be different.

The context-specific content, whether for an email message or for a calendar event, can be provided by a database and database applications operating within a cloud-based system such as a PaaS system, a SaaS system, an IaaS system, a BaaS system, a proprietary computer system, or some other type of computer system. To generate the context-specific content, the database receives PIM application context data from the PIM application and executes one or more database applications (apps) using the context data as input for the apps.

The PIM application context data is retrieved from the selected PIM message. PIM application context data from an email message may include the subject, the email participants, and content from the body of the email message. The email participants may include the sender, the primary recipient(s) and the carbon copy (cc) recipients. PIM application context data for a calendar event may include the subject, the body, the participants, the participation response, and the appointment/meeting start and end time.

After receipt of the PIM application context data, a database server operating in the database system can supply the PIM application context data to database applications and invoke the database applications to generate context-specific content to display in the context-specific content pane of the PIM application's user interface. The database server can format the context-specific content in a manner suitable to display in the context-specific content pane and consequently may format the content into a web page or as HTML content.

Instead of the context-specific content being limited to people content, accounts content, opportunities content, and case content, as in the prior example, the database server can provide a user with a variety of options for customizing the context-specific content. The database server can invoke an application selection component executing within the database system which allows for the selection of a number of different types of database applications to use in generating the context-specific content.

The applications available for selection for generating context-specific content can include database supplied applications, custom managed applications that are developed by third parties and purchased on an app exchange, or custom customer applications that are developed by a user's organization. The application selection component can provide a user interface that allows for the selection of the application to use in generating context-specific content. It allows the user to customize the context-specific content through the selection of the applications used to generate the content.

Figure 3:
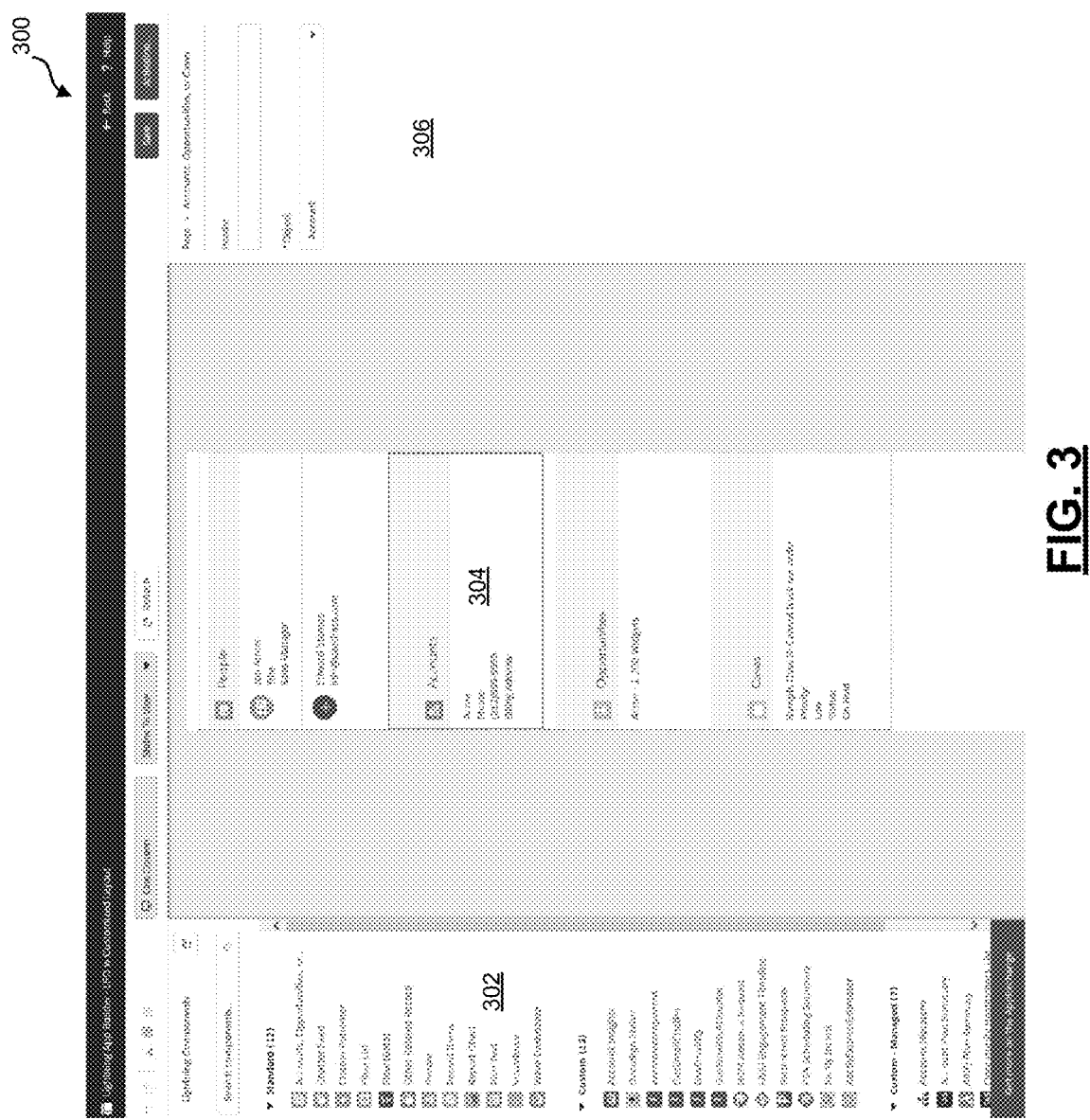
FIG. 3 is a block diagram depicting a screenshot of an example user interface for an application selection component for use by a user in customizing its context-specific content.

FIG. 3 is a block diagram depicting a screenshot of an example user interface 300 for an application selection component for use by a user in customizing its context-specific content through the selection of specific applications. The example user interface 300 includes a first pane (i.e., selection pane) 302 which lists the applications available for selection. The applications are grouped into three groupings, in this example, the standard or database supplied applications, custom customer applications, and custom managed applications.

The user interface includes a second pane (i.e., a layout pane) 304 into which the user can drag and order selected applications. The user can drag one or more applications from any of the application groupings into this layout pane. The user can also select the order in which data from the applications will appear by changing the order in which the applications appear in the layout pane. For example, if a user would like the data generated from a first application to appear before the data generated from a second application in the context-specific content pane in the PIM application's user interface, the user can drag the first application to a position above the second application in the layout pane.

The user interface may also include a third pane 306 that displays user-selectable parameters for refining the behavior of an application that displays in the context-specific content pane (208) displayed by the PIM application. This allows the user to define parameters such as section titles, the query logic that a section executes, the CRM object with which a section specifically works, and others.

Figure 4:
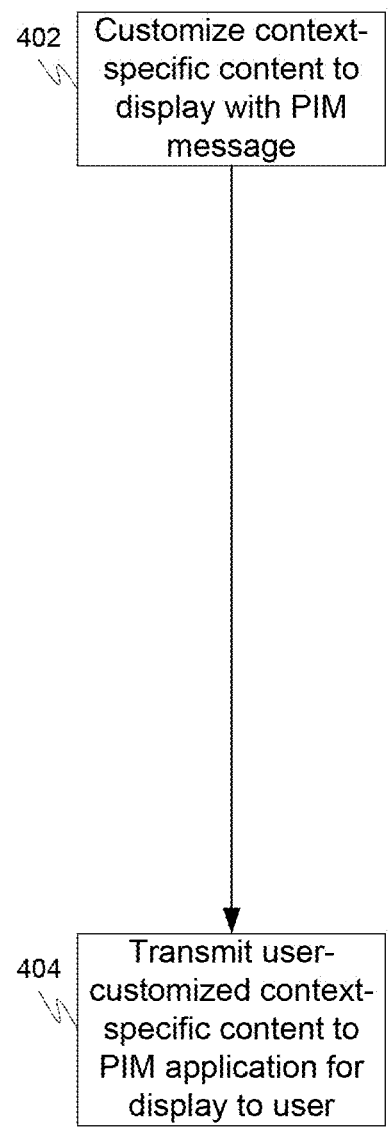
FIG. 4 is a process flow chart depicting an example process for generating user-customized context-specific content for display in the user interface of a PIM application.

FIG. 4 is a process flow chart depicting an example process for generating user-customized context-specific content for display in the user interface of a PIM application. The example process depicted in FIG. 4 includes operations to customize context-specific content to display with PIM message (operation 402). This occurs in a computing system external to the PIM application. The external computing system, in response to a user's identification of specific functional tools, reserves the identified functional tools for use in generating context-specific content. When a request is received by the PIM application to provide context-specific content, the external computing system generates the context-specific content using the user identified functional tools.

The example process also includes operations to transmit the user-customized context-specific content to the PIM application for display to user (operation 404). The external computing system transmits the user-customized context-specific content to the PIM application in response to a request by the PIM application for the context-specific content and after the context-specific content has been generated using the functional tools.

Figure 5:
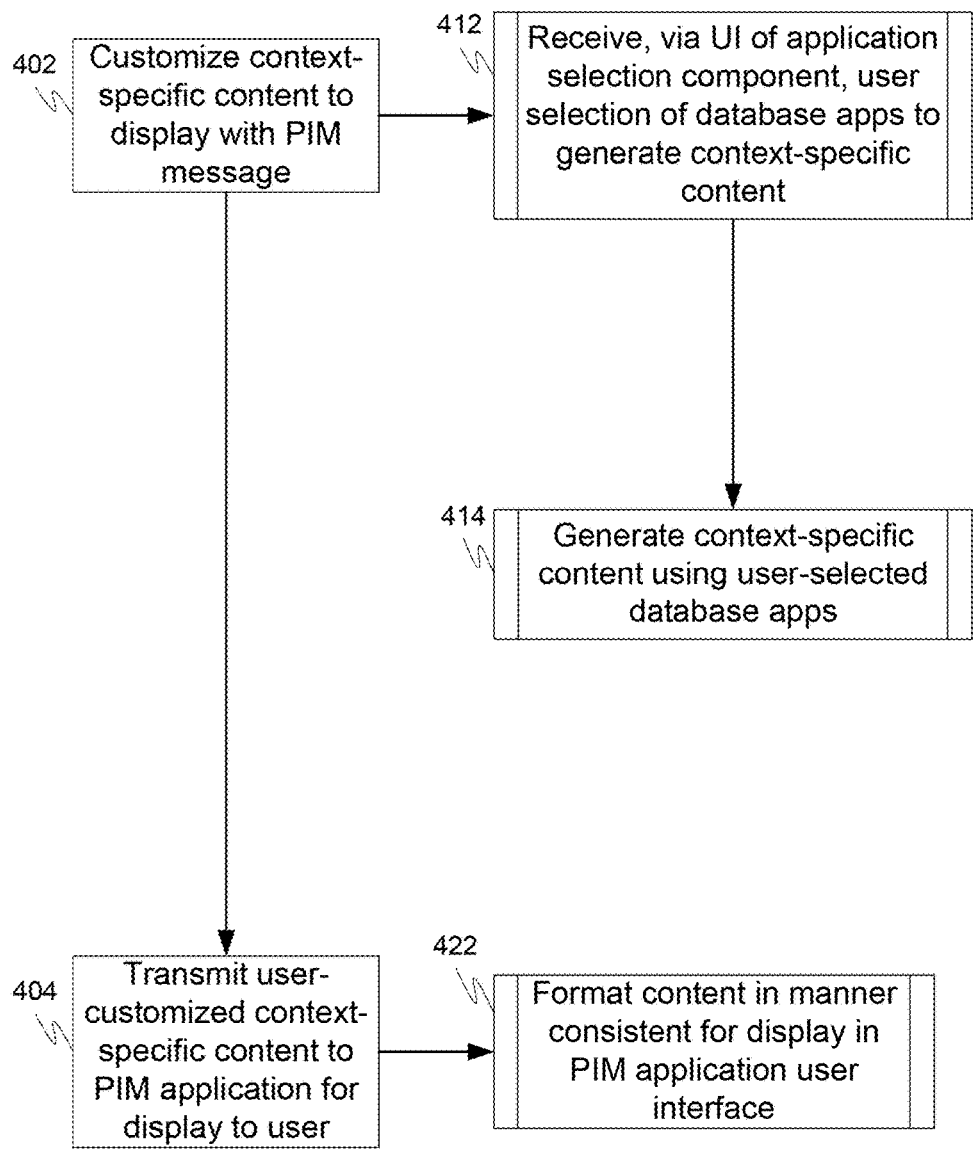
FIG. 5 is a process flow chart depicting another example process for generating user-customized context-specific content for display in the user interface of a PIM application.

FIG. 5 depicts a process flow chart illustrating another example process for generating user-customized context-specific content for display in the user interface of a PIM application. This example process includes operations similar to operations of the example process of FIG. 4. In particular, this example includes operations to customize context-specific content to display with a PIM message (operation 402), which involves the external computing system reserving user-identified functional tools for use in generating context-specific content, and includes operations to transmit user-customized context-specific content to the PIM application for display to a user (operation 404), which involves the external computing system transmitting the user-customized context-specific content to the PIM application in response to a request by the PIM application for the context-specific content and after the context-specific content has been generated using the functional tools.

Additionally, in this example, operations to customize context-specific content to display with a PIM message (operation 402) includes receiving, via the user interface of an application selection component, user selection of functional tools such as database applications to generate context-specific content (operation 412) and generating context-specific content using the user-selected functional tools or database apps (operation 414). Operations to transmit user-customized context-specific content to the PIM application for display to the user, in this example, includes formatting content in a manner consistent for display in a PIM application user interface (operation 422).

Figure 6:
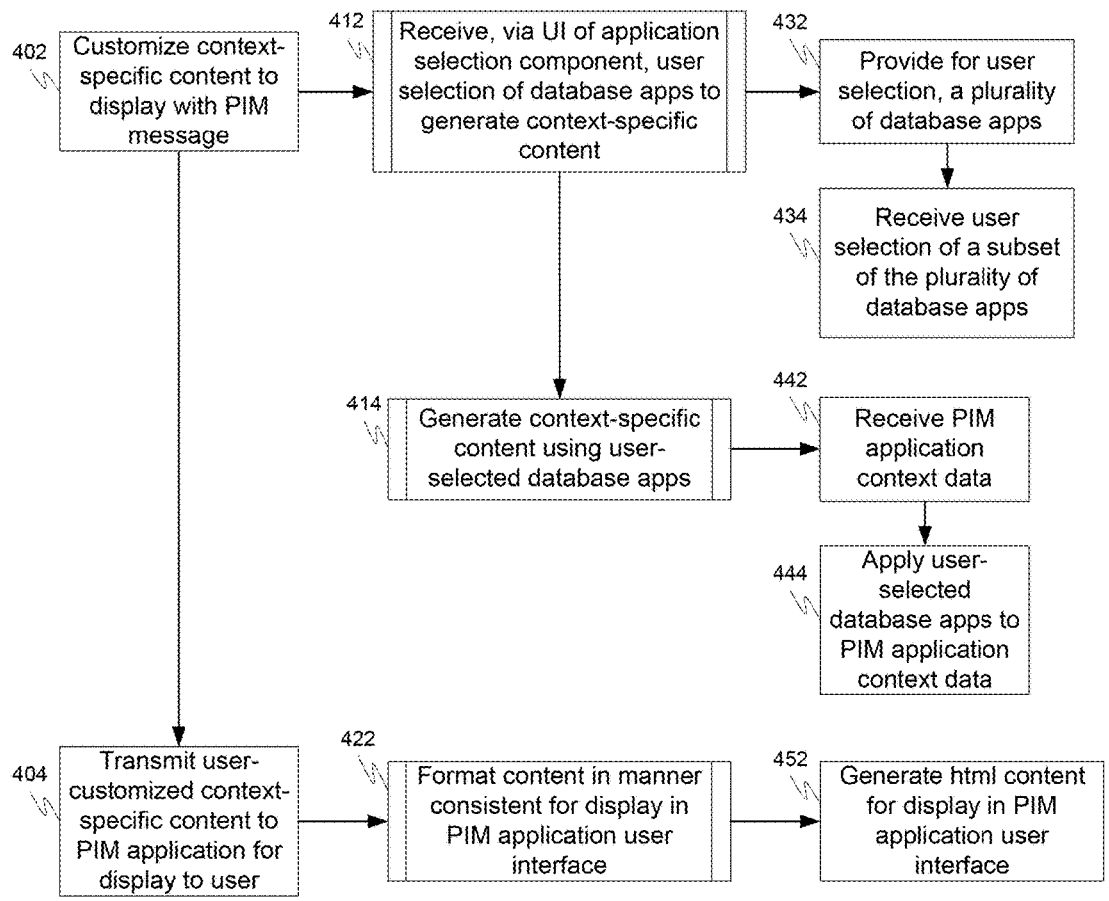
FIG. 6 is a process flow chart depicting another example process for generating user-customized context-specific content for display in the user interface of a PIM application.

FIG. 6 depicts a process flow chart illustrating another example process for generating user-customized context-specific content for display in the user interface of a PIM application. This example process includes operations similar to operations of the example process of FIG. 5. In particular, this example includes operations to customize context-specific content to display with a PIM message (operation 402), which involves the external computing system reserving user-identified functional tools for use in generating context-specific content, and includes operations to transmit user-customized context-specific content to the PIM application for display to a user (operation 404), which involves the external computing system transmitting the user-customized context-specific content to the PIM application in response to a request by the PIM application for the context-specific content and after the context-specific content has been generated using the functional tools.

Additional example operations are also provided in this example. Operations to receive, via the user interface of the application selection component, user selection of database applications to generate context-specific content (operation 412) include providing, for user selection, a plurality of database apps (operation 432) and receiving user selection of a subset of the plurality of database apps (operation 434). Operations to generate context-specific content using the user-selected database apps (operation 414) includes receiving PIM application context data (operation 442) and applying user-selected database apps to the PIM application context data (operation 444). Operations to format content in manner consistent for display in the PIM application user interface (operation 422) includes generating HTML content for display in the PIM application user interface (operation 452).

In some examples, user selection of functional tools can only be made by a user with administrative privileges, i.e., an admin user. The admin user, in some examples, may not be the end-user of the PIM application. In other examples, the admin user and the end-user are the same user. Thus, with respect to operations 432, 434, 414, 412, and 444, in some examples, the user is the admin user and may not be the end-user of the PIM application.

Figure 7:
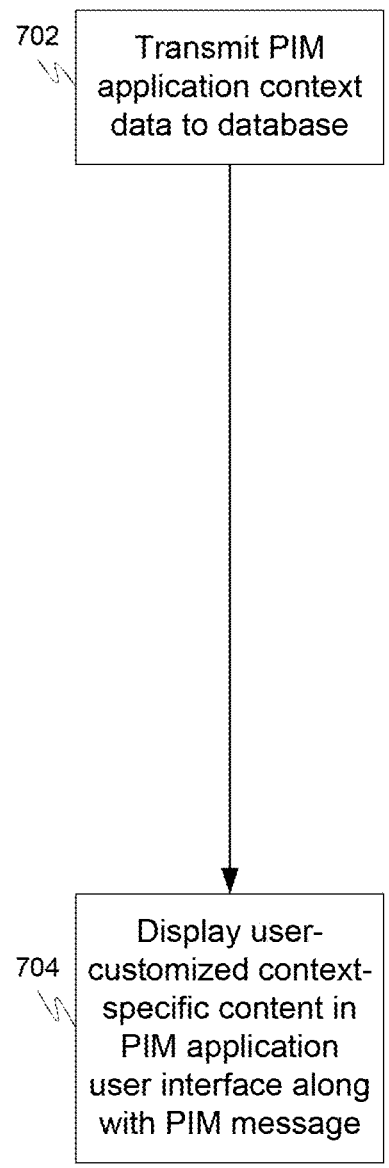
FIG. 7 is a process flow chart depicting an example process for a PIM application when interacting with a database server to receive user-customized context-specific content for display in the user interface of the PIM application.

FIG. 7 is a process flow chart depicting an example process for a PIM application when interacting with a database server to receive user-customized context-specific content for display in the user interface of the PIM application. The example process depicted in FIG. 7 includes operations to transmit PIM application context data to the database server (operation 702). This occurs when a specific PIM message is selected for viewing. The example process also includes operations to display user-customized context-specific content in the PIM application user interface along with the PIM message (operation 704).

Figure 8:
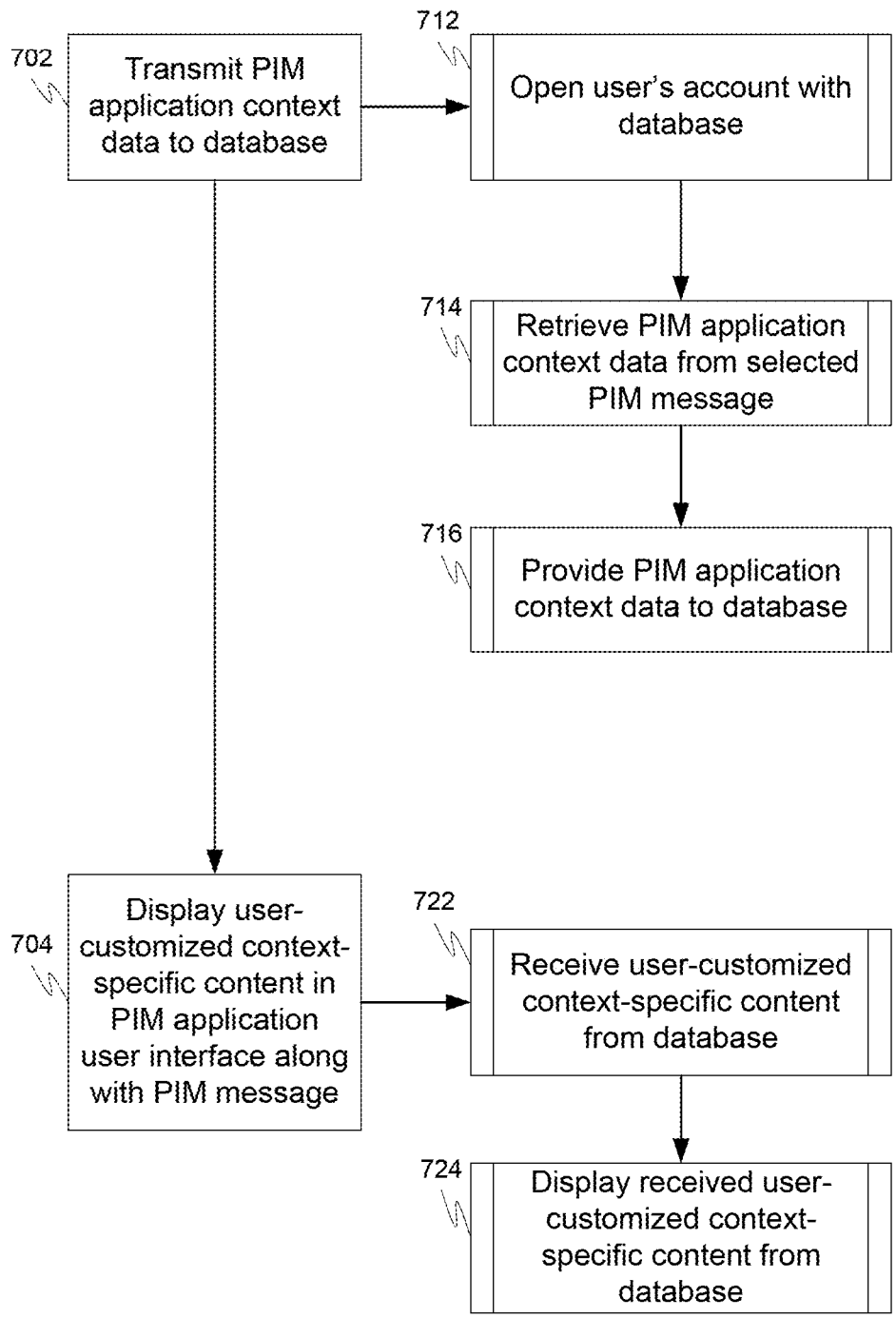
FIG. 8 is a process flow chart depicting another example process for a PIM application when interacting with a database server to receive user-customized context-specific content for display in the user interface of the PIM application.

FIG. 8 is a process flow chart depicting another example process for a PIM application when interacting with a database server to receive user-customized context-specific content for display in the user interface of the PIM application. This example process includes operations similar to operations of the example process of FIG. 7. In particular, this example includes operations to transmit PIM application context data to the database server (operation 702) and operations to display user-customized context-specific content in the PIM application user interface along with the PIM message (operation 704).

Additionally, in this example, operations to transmit PIM application context data to the database server (operation 702) includes opening the user's account with the database (operation 712), retrieving PIM application context data from the selected PIM message (operation 714), and providing PIM application context data to the database (operation 716). Operations to display user-customized context-specific content in the PIM application user interface along with the PIM message (operation 704) includes receiving user-customized context-specific content from the database (operation 722) and displaying the received user-customized context-specific content from the database in the PIM application user interface (operation 724).

Figure 9:
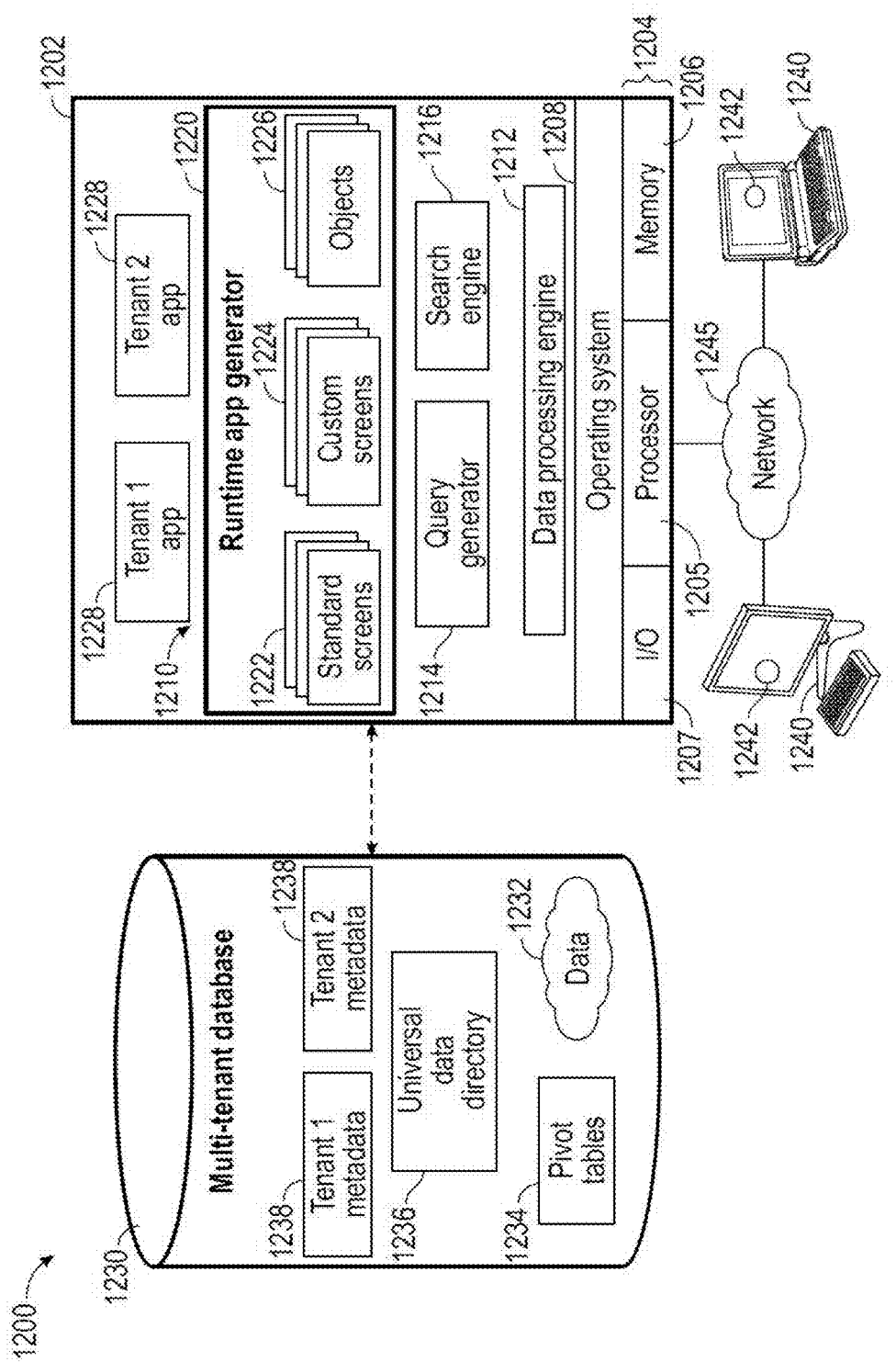
FIG. 9 is a block diagram depicting an exemplary embodiment of an on-demand multi-tenant database system that may be provided as a PaaS system.

FIG. 9 and the following discussion are intended to provide a brief, general description of one non-limiting example of an example environment in which the embodiments described herein may be implemented. The embodiments described herein may also be practiced with other computing environments.

FIG. 9 depicts an exemplary embodiment of an on-demand multi-tenant database system 1200 that may be provided as a PaaS system. The illustrated multi-tenant system 1200 of FIG. 9 includes a server 1202 that dynamically creates and supports virtual applications 1228 based upon data 1232 from a common database 1230 that is shared between multiple tenants, alternatively referred to herein as a multi-tenant database. Data and services generated by the virtual applications 1228 are provided via a network 1245 to any number of client devices 1240, as desired. Each virtual application 1228 is suitably generated at run-time (or on-demand) using a common application platform 1210 that securely provides access to the data 1232 in the database 1230 for each of the various tenants subscribing to the multi-tenant system 1200. In accordance with one non-limiting example, the multi-tenant system 1200 is implemented in the form of an on-demand multi-tenant customer relationship management (CRM) system that can support any number of authenticated users of multiple tenants.

As used herein, a "tenant" or an "organization" should be understood as referring to a group of one or more users or entities that shares access to common subset of the data within the multi-tenant database 1230. In this regard, each tenant includes one or more users associated with, assigned to, or otherwise belonging to that respective tenant. To put it another way, each respective user within the multi-tenant system 1200 is associated with, assigned to, or otherwise belongs to a particular tenant of the plurality of tenants supported by the multi-tenant system 1200. Tenants may represent customers, customer departments, business or legal organizations, and/or any other entities that maintain data for particular sets of users within the multi-tenant system 1200 (i.e., in the multi-tenant database 1230). For example, the application server 1202 may be associated with one or more tenants supported by the multi-tenant system 1200. Although multiple tenants may share access to the server 1202 and the database 1230, the particular data and services provided from the server 1202 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 1232 belonging to or otherwise associated with other tenants.

The multi-tenant database 1230 is any sort of repository or other data storage system capable of storing and managing the data 1232 associated with any number of tenants. The database 1230 may be implemented using any type of conventional database server hardware. In various embodiments, the database 1230 shares processing hardware 1204 with the server 1202. In other embodiments, the database 1230 is implemented using separate physical and/or virtual database server hardware that communicates with the server 1202 to perform the various functions described herein. In an exemplary embodiment, the database 1230 includes a database management system or other equivalent software capable of determining an optimal query plan for retrieving and providing a particular subset of the data 1232 to an instance of virtual application 1228 in response to a query initiated or otherwise provided by a virtual application 1228. The multi-tenant database 1230 may alternatively be referred to herein as an on-demand database, in that the multi-tenant database 1230 provides (or is available to provide) data at run-time to on-demand virtual applications 1228 generated by the application platform 1210.

In practice, the data 1232 may be organized and formatted in any manner to support the application platform 1210. In various embodiments, the data 1232 is suitably organized into a relatively small number of large data tables to maintain a semi-amorphous "heap"-type format. The data 1232 can then be organized as needed for a particular virtual application 1228. In various embodiments, conventional data relationships are established using any number of pivot tables 1234 that establish indexing, uniqueness, relationships between entities, and/or other aspects of conventional database organization as desired. Further data manipulation and report formatting is generally performed at run-time using a variety of metadata constructs. Metadata within a universal data directory (UDD) 1236, for example, can be used to describe any number of forms, reports, workflows, user access privileges, business logic and other constructs that are common to multiple tenants. Tenant-specific formatting, functions and other constructs may be maintained as tenant-specific metadata 1238 for each tenant, as desired. Rather than forcing the data 1232 into an inflexible global structure that is common to all tenants and applications, the database 1230 is organized to be relatively amorphous, with the pivot tables 1234 and the metadata 1238 providing additional structure on an as-needed basis. To that end, the application platform 1210 suitably uses the pivot tables 1234 and/or the metadata 1238 to generate "virtual" components of the virtual applications 1228 to logically obtain, process, and present the relatively amorphous data 1232 from the database 1230.

The server 1202 is implemented using one or more actual and/or virtual computing systems that collectively provide the dynamic application platform 1210 for generating the virtual applications 1228. For example, the server 1202 may be implemented using a cluster of actual and/or virtual servers operating in conjunction with each other, typically in association with conventional network communications, cluster management, load balancing and other features as appropriate. The server 1202 operates with any sort of conventional processing hardware 1204, such as a processor 1205, memory 1206, input/output features 1207 and the like. The input/output features 1207 generally represent the interface(s) to networks (e.g., to the network 1245, or any other local area, wide area or other network), mass storage, display devices, data entry devices and/or the like. The processor 1205 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 1206 represents any non-transitory short or long term storage or other computer-readable media capable of storing programming instructions for execution on the processor 1205, including any sort of random access memory (RAM), read only memory (ROM), flash memory, magnetic or optical mass storage, and/or the like. The computer-executable programming instructions, when read and executed by the server 1202 and/or processor 1205, cause the server 1202 and/or processor 1205 to create, generate, or otherwise facilitate the application platform 1210 and/or virtual applications 1228 and perform one or more additional tasks, operations, functions, and/or processes described herein. It should be noted that the memory 1206 represents one suitable implementation of such computer-readable media, and alternatively or additionally, the server 1202 could receive and cooperate with external computer-readable media that is realized as a portable or mobile component or application platform, e.g., a portable hard drive, a USB flash drive, an optical disc, or the like.

The application platform 1210 is any sort of software application or other data processing engine that generates the virtual applications 1228 that provide data and/or services to the client devices 1240. In a typical embodiment, the application platform 1210 gains access to processing resources, communications interfaces and other features of the processing hardware 1204 using any sort of conventional or proprietary operating system 1208. The virtual applications 1228 are typically generated at run-time in response to input received from the client devices 1240. For the illustrated embodiment, the application platform 1210 includes a bulk data processing engine 1212, a query generator 1214, a search engine 1216 that provides text indexing and other search functionality, and a runtime application generator 1220. Each of these features may be implemented as a separate process or other module, and many equivalent embodiments could include different and/or additional features, components or other modules as desired.

The runtime application generator 1220 dynamically builds and executes the virtual applications 1228 in response to specific requests received from the client devices 1240. The virtual applications 1228 are typically constructed in accordance with the tenant-specific metadata 1238, which describes the particular tables, reports, interfaces and/or other features of the particular application 1228. In various embodiments, each virtual application 1228 generates dynamic web content that can be served to a browser or other client program 1242 associated with its client device 1240, as appropriate.

The runtime application generator 1220 suitably interacts with the query generator 1214 to efficiently obtain multi-tenant data 1232 from the database 1230 as needed in response to input queries initiated or otherwise provided by users of the client devices 1240. In a typical embodiment, the query generator 1214 considers the identity of the user requesting a particular function (along with the user's associated tenant), and then builds and executes queries to the database 1230 using system-wide metadata 1236, tenant specific metadata 1238, pivot tables 1234, and/or any other available resources. The query generator 1214 in this example therefore maintains security of the common database 1230 by ensuring that queries are consistent with access privileges granted to the user and/or tenant that initiated the request. In this manner, the query generator 1214 suitably obtains requested subsets of data 1232 accessible to a user and/or tenant from the database 1230 as needed to populate the tables, reports or other features of the particular virtual application 1228 for that user and/or tenant.

Still referring to FIG. 9, the data processing engine 1212 performs bulk processing operations on the data 1232 such as uploads or downloads, updates, online transaction processing, and/or the like. In many embodiments, less urgent bulk processing of the data 1232 can be scheduled to occur as processing resources become available, thereby giving priority to more urgent data processing by the query generator 1214, the search engine 1216, the virtual applications 1228, etc.

In exemplary embodiments, the application platform 1210 is utilized to create and/or generate data-driven virtual applications 1228 for the tenants that they support. Such virtual applications 1228 may make use of interface features such as custom (or tenant-specific) screens 1224, standard (or universal) screens 1222 or the like. Any number of custom and/or standard objects 1226 may also be available for integration into tenant-developed virtual applications 1228. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 1226 such as "account" objects, "opportunity" objects, "contact" objects, or the like. The data 1232 associated with each virtual application 1228 is provided to the database 1230, as appropriate, and stored until it is requested or is otherwise needed, along with the metadata 1238 that describes the particular features (e.g., reports, tables, functions, objects, fields, formulas, code, etc.) of that particular virtual application 1228. For example, a virtual application 1228 may include a number of objects 1226 accessible to a tenant, wherein for each object 1226 accessible to the tenant, information pertaining to its object type along with values for various fields associated with that respective object type are maintained as metadata 1238 in the database 1230. In this regard, the object type defines the structure (e.g., the formatting, functions and other constructs) of each respective object 1226 and the various fields associated therewith.

Still referring to FIG. 9, the data and services provided by the server 1202 can be retrieved using any sort of personal computer, mobile telephone, tablet or other network-enabled client device 1240 on the network 1245. In an exemplary embodiment, the client device 1240 includes a display device, such as a monitor, screen, or another conventional electronic display capable of graphically presenting data and/or information retrieved from the multi-tenant database 1230. Typically, the user operates a conventional browser application or other client program 1242 executed by the client device 1240 to contact the server 1202 via the network 1245 using a networking protocol, such as the hypertext transport protocol (HTTP) or the like. The user typically authenticates his or her identity to the server 1202 to obtain a session identifier ("SessionID") that identifies the user in subsequent communications with the server 1202. When the identified user requests access to a virtual application 1228, the runtime application generator 1220 suitably creates the application at run time based upon the metadata 1238, as appropriate. As noted above, the virtual application 1228 may contain Java, ActiveX, or other content that can be presented using conventional client software running on the client device 1240; other embodiments may simply provide dynamic web or other content that can be presented and viewed by the user, as desired.

The apparatus, systems, techniques and articles described herein allow functional tools from a cloud-based system such as a PaaS system, a SaaS system, an IaaS system, a BaaS system, a proprietary computer system, or some other type of computer system to be utilized in the user interface of a PIM application. The selection pane in an application selection component can serve as a platform for choosing the functional tools that provide specialized content in PIM applications such as Outlook and Gmail. The functional tools, for example in the form of database applications, may be provided by a number of sources including third party developers on an app exchange and customer developers. A user may customize the context-specific content displayed in the PIM application user interface by selecting the functional tools provided by the cloud-based system, third party developers and/or customer developers that are actually used to generate context-specific content. The cloud-based service provider may also provide authentication services to the third party developers and customer developers as well as software hosting and maintenance services to allow the third party developers and customer developers to focus on the functional tools and flows that they provide in the PIM applications. The apparatus, systems, techniques and articles described herein may allow for a wide and varied range of user experiences in PIM applications such as Outlook and Gmail.

In one embodiment, a method of generating context-specific content from a database system for display in a user interface of a personal information management (PIM) application is disclosed. The method comprises receiving, by a database server, user selection of one or more database applications from a requesting user to generate context-specific content customized by the requesting user for display in a PIM application user interface. The method further comprises generating, using the user-selected database applications, user-customized context-specific content and transmitting to the PIM application, by the database server, the user-customized context-specific content for display in the PIM application user interface along with a PIM message. The user-customized context-specific content is relevant to the PIM message.

These aspects and other embodiments may include one or more of the following features. The method may further comprise providing a plurality of database applications for selection by a requesting user to generate context-specific content. Receiving user selection of one or more database applications from a requesting user may comprise receiving user selection of a subset of the plurality of database applications. The method may further comprise receiving PIM application context data from the PIM application. Generating using the user-selected database applications user-customized context-specific content may comprise applying the user-selected database applications to the PIM application context data to generate the user-customized context-specific content. The method may further comprise formatting the user-customized context-specific content in manner consistent for display in the PIM application user interface. Formatting the user-customized context-specific content may comprise generating HTML content for display in the PIM application user interface.

In another embodiment, a computer system comprising one or more processors and a database system implemented by the one or more processors is provided. The database system is configured by programming instructions, executable on the computer system, to cause the one or more processors to receive user selection of one or more database applications from a requesting user to generate context-specific content customized by the requesting user for display in a PIM application user interface, generate using the user-selected database applications user-customized context-specific content, and transmit to the PIM application the user-customized context-specific content for display in the PIM application user interface along with a PIM message. The user-customized context-specific content is relevant to the PIM message.

These aspects and other embodiments may include one or more of the following features. The programming instructions may further comprise programming instructions, executable on the computer system, to cause the one or more processors to provide a plurality of database applications for selection by a requesting user to generate context-specific content. The programming instructions, executable on the computer system, to cause the one or more processors to receive user selection of one or more database applications from a requesting user may comprise programming instructions, executable on the computer system, to cause the one or more processors to receive user selection of a subset of the plurality of database applications. The programming instructions may further comprise programming instructions, executable on the computer system, to cause the one or more processors to receive PIM application context data from the PIM application. The programming instructions, executable on the computer system, to cause the one or more processors to generate using the user-selected database applications user-customized context-specific content may comprise programming instructions, executable on the computer system, to cause the one or more processors to apply the user-selected database applications to the PIM application context data to generate the user-customized context-specific content. The programming instructions may further comprise programming instructions, executable on the computer system, to cause the one or more processors to format the user-customized context-specific content in manner consistent for display in the PIM application user interface. The programming instructions, executable on the computer system, to cause the one or more processors to format the user-customized context-specific content may comprise programming instructions, executable on the computer system, to cause the one or more processors to generate HTML content for display in the PIM application user interface.

In another embodiment, a non-transitory computer readable storage medium embodying programming instruction for performing a method is disclosed. The method comprises receiving, by a database server, user selection of one or more database applications from a requesting user to generate context-specific content customized by the requesting user for display in a PIM application user interface. The method further comprises generating, using the user-selected database applications, user-customized context-specific content and transmitting to the PIM application, by the database server, the user-customized context-specific content for display in the PIM application user interface along with a PIM message. The user-customized context-specific content is relevant to the PIM message.

These aspects and other embodiments may include one or more of the following features. The method may further comprise providing a plurality of database applications for selection by a requesting user to generate context-specific content. Receiving user selection of one or more database applications from a requesting user may comprise receiving user selection of a subset of the plurality of database applications. The method may further comprise receiving PIM application context data from the PIM application. Generating using the user-selected database applications user-customized context-specific content may comprise applying the user-selected database applications to the PIM application context data to generate the user-customized context-specific content. The method may further comprise formatting the user-customized context-specific content in manner consistent for display in the PIM application user interface. Formatting the user-customized context-specific content may comprise generating HTML content for display in the PIM application user interface.

In another embodiment, a computer-implemented method in a computer system comprising a database system for generating context-specific content for display in a user interface of a personal information management (PIM) application is disclosed. The method comprises providing, by a database server for display in a user interface, a plurality of database applications for user selection to generate context specific content for display in a PIM application user interface. The method further comprises receiving user selection of a subset of the database applications from a requesting user to generate context specific content customized by the requesting user for display in the PIM application user interface and receiving, at the database server from the PIM application, PIM application context data wherein the PIM application context data is retrieved from a PIM message. The method also comprises generating using the user-selected database applications user-customized context specific content and transmitting to the PIM application, by the database server, the user-customized context specific content for display in the PIM application user interface along with the PIM message.

In yet another embodiment, a computer system is provided. The computer system comprises one or more processors, an application selection component, and a server. The application selection component is implemented by the one or more processors and is configured by programming instructions, executable on the computer system, to cause the one or more processors to provide a user interface to receive user selection of one or more functional tools from a requesting user to generate context-specific content customized by the requesting user for display in a user interface of a PIM application. The server is implemented by the one or more processors and configured by second programming instructions to receive PIM context data from the PIM application, provide the PIM context data to the user-selected functional tools, and transmit the context-specific content generated by the user-selected functional tools to the PIM application for display in the PIM application user interface along with a PIM message.

These aspects and other embodiments may include one or more of the following features. The user interface may comprise a selection pane that displays a plurality of functional tools for user selection in generating context-specific content. The plurality of functional tools may comprise third-party provided functional tools, user organization provided functional tools, and computer system provided functional tools. The user interface may comprise a layout pane into which the user-selected functional tools can be dragged and ordered to set the display order of the context-specific content provided to the PIM application.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of generating context-specific content from a database system for display in a user interface of a personal information management (PIM) application, the method comprising:
   receiving, by a database server, user selection of one or more database applications from a requesting user to generate context-specific content customized by the requesting user for display in a PIM application user interface;
   generating, using the user-selected database applications, user-customized context-specific content; and
   transmitting to the PIM application, by the database server, the user-customized context-specific content for display in the PIM application user interface along with a PIM message, the user-customized context-specific content including information that describes one or more attributes of PIM message participants that is not included in the PIM message, the attributes including one or more of job title, account name, company, address, product name, or service name.

2. The method of claim 1 further comprising providing a plurality of database applications for selection by a requesting user to generate context-specific content.

3. The method of claim 2 wherein receiving user selection of one or more database applications from a requesting user comprises receiving user selection of a subset of the plurality of database applications.

4. The method of claim 1 further comprising receiving, by the database server, PIM application context data from the PIM application, the PIM application context data including a listing of the PIM message participants.

5. The method of claim 4 wherein generating using the user-selected database applications user-customized context-specific content comprises applying the user-selected database applications to the listing of the PIM message participants to generate the user-customized context-specific content.

6. The method of claim 1 further comprising formatting the user-customized context-specific content in manner consistent for display in the PIM application user interface.

7. The method of claim 6 wherein formatting the user-customized context-specific content comprises generating HTML content for display in the PIM application user interface.

8. A computer system comprising:
one or more processors; and
a database system implemented by the one or more processors, the database system configured by programming instructions, executable on the computer system, to cause the one or more processors to:
receive user selection of one or more database applications from a requesting user to generate context-specific content customized by the requesting user for display in a PIM application user interface;
generate using the user-selected database applications user-customized context-specific content; and
transmit to the PIM application the user-customized context-specific content for display in the PIM application user interface along with a PIM message, the user-customized context-specific content including information that describes one or more attributes of PIM message participants that is not included in the PIM message, the attributes including one or more of job title, account name, company, address, product name, or service name.

9. The computer system of claim 8 further comprising programming instructions, executable on the computer system, to cause the one or more processors to provide a plurality of database applications for selection by a requesting user to generate context-specific content.

10. The computer system of claim 9 wherein the programming instructions, executable on the computer system, to cause the one or more processors to receive user selection of one or more database applications from a requesting user comprise programming instructions, executable on the computer system, to cause the one or more processors to receive user selection of a subset of the plurality of database applications.

11. The computer system of claim 8 further comprising programming instructions, executable on the computer system, to cause the one or more processors to receive PIM application context data from the PIM application, the PIM application context data including a listing of the PIM message participants.

12. The computer system of claim 11 wherein the programming instructions, executable on the computer system, to cause the one or more processors to generate using the user-selected database applications user-customized context-specific content comprise programming instructions, executable on the computer system, to cause the one or more processors to apply the user-selected database applications to the listing of the PIM message participants to generate the user-customized context-specific content.

13. The computer system of claim 8 further comprising programming instructions, executable on the computer system, to cause the one or more processors to format the user-customized context-specific content in manner consistent for display in the PIM application user interface.

14. The computer system of claim 13 wherein the programming instructions, executable on the computer system, to cause the one or more processors to format the user-customized context-specific content comprise programming instructions, executable on the computer system, to cause the one or more processors to generate HTML content for display in the PIM application user interface.

15. A non-transitory computer readable storage medium embodying programming instruction for performing a method, the method comprising:
receiving, by a database server, user selection of one or more database applications from a requesting user to generate context-specific content customized by the requesting user for display in a PIM application user interface;
generating, using the user-selected database applications, user-customized context-specific content; and
transmitting to the PIM application, by the database server, the user-customized context-specific content for display in the PIM application user interface along with a PIM message, the user-customized context-specific content including information that describes one or more attributes of PIM message participants that is not included in the PIM message, the attributes including one or more of job title, account name, company, address, product name, or service name.

16. The non-transitory computer readable storage medium of claim 15 wherein the method further comprises providing a plurality of database applications for selection by a requesting user to generate context-specific content.

17. The non-transitory computer readable storage medium of claim 16 wherein receiving user selection of one or more database applications from a requesting user comprises receiving user selection of a subset of the plurality of database applications.

18. The non-transitory computer readable storage medium of claim 15 wherein the method further comprises receiving, by the database server, PIM application context data from the PIM application, the PIM application context data including a listing of the PIM message participants.

19. The non-transitory computer readable storage medium of claim 18 wherein generating using the user-selected database applications user-customized context-specific content comprises applying the user-selected database applications to the listing of the PIM message participants to generate the user-customized context-specific content.

20. The non-transitory computer readable storage medium of claim 15 wherein the method further comprises formatting the user-customized context-specific content in manner consistent for display in the PIM application user interface.

* * * * *